United States Patent [19]

Licht et al.

[11] 3,960,400
[45] June 1, 1976

[54] LIGHTWEIGHT RAILWAY WHEEL

[75] Inventors: Helmut Licht, Bochum; Willi Kasper, Wattenscheid-Hontrop, both of Germany

[73] Assignee: Fried. Krupp Huttenwerke AG, Bochum, Germany

[22] Filed: May 6, 1974

[21] Appl. No.: 467,308

[30] Foreign Application Priority Data
May 12, 1973 Germany............................ 2324117

[52] U.S. Cl...................................... 295/11; 295/7; 295/21; 295/22
[51] Int. Cl.²...................... B60B 3/02; B60B 9/14; B60B 17/00; B60B 19/14
[58] Field of Search ................... 295/21, 22, 23, 24, 295/25, 26, 7, 11

[56] References Cited
UNITED STATES PATENTS
| | | | |
|---|---|---|---|
| 1,958,642 | 5/1934 | Rosenberg | 295/22 X |
| 2,548,839 | 4/1951 | Coombes | 295/11 |
| 3,334,886 | 8/1967 | Caunt | 295/11 X |

FOREIGN PATENTS OR APPLICATIONS
| | | | |
|---|---|---|---|
| 60,153 | 12/1891 | Germany | 295/22 |
| 603,694 | 10/1934 | Germany | 295/22 |
| 705,616 | 5/1941 | Germany | 295/21 |
| 889,754 | 9/1953 | Germany | 295/25 |
| 718,013 | 11/1954 | United Kingdom | 295/24 |

*Primary Examiner*—Robert J. Spar
*Assistant Examiner*—Howard Beltran
*Attorney, Agent, or Firm*—Haseltine, Lake & Waters

[57] ABSTRACT

A railway wheel of lightweight construction, having a disc-like wheel body and a tire which is tension-mounted on the wheel rim, and with the wheel disc including a tangential undulating or wavelike configuration of radially extending crests and troughs. In the railway wheel, between an inner annularly extending groove formed in the wheel tire and an outer annular groove formed in the wheel rim, there is provided a pre-tensioned or pre-stressed rubber insert, and in which the wheel disc has a radially unwaved conical basic configuration.

3 Claims, 4 Drawing Figures

LIGHTWEIGHT RAILWAY WHEEL

FIELD OF THE INVENTION

The present invention relates to a railway wheel of lightweight construction, having a disc-like wheel body and a tire which is tension-mounted on the wheel rim, and with the wheel disc including a tangential undulating or wavelike configuration of radially extending crests and troughs.

DISCUSSION OF THE PRIOR ART

In a known railway wheel of the type described, the wheel tire is tension-mounted on the wheel rim. This introduces high prestresses into the wheel disc, which inherently with the expense of radial and tangential double undulations incorporating large wave or crest depths, and the need for optimum grid forms, require the use of alloyed and heat-treated spring steels.

SUMMARY OF THE INVENTION

Accordingly, it is an object of the present invention to provide a railway wheel of lightweight construction which satisfies the two basic requirements of affording a lighterweight and a simpler method of construction.

The foregoing object is inventively achieved for a railway wheel of the above-mentioned type in that, between an inner annularly extending groove formed in the wheel tire and an outer annular groove formed in the wheel rim, there is provided a pre-tensioned or prestressed rubber insert, and in which the wheel disc has a radially unwaved conical basic configuration.

By means of the joint application of both of these measures, it thus becomes possible to make the wheel disc much lighter in weight, and to be much simpler built in manufacture, inasmuch as high prestresses are no longer transmitted to the wheel disc through the wheel tire. Nevertheless, the wheel tire is sufficiently rigidly seated on the wheel disc body so as to, during braking and/or acceleration of the vehicle, be able to transmit the generated torque or torsional moments.

It is generally known that in railway wheels there may be arranged a prestressed rubber insert between an inner annular groove formed in the wheel tire and an outer annular groove formed the wheel rim, however, the purpose of that type of rubber insert is to impart an elasticity or spring-loading to the railway wheel. With reference to the object of the invention, which relates to reducing the weight and to facilitate the manufacture of the railway wheel in a lightweight constructional mode, this has nothing to do with an elasticity-imparting rubber insert for a rubber-spring loaded railway wheel.

In accordance with an embodiment of the invention, the transitional region between the crests and troughs of the undulations have a constant curvature along their total length. Consequently, such railway wheels may be constructed on easily manufactured dies.

Preferably, the wave-like configuration is trapezoidally shaped.

A die for producing this undulation may also be similarly produced without any great difficulties.

In accordance with a further embodiment of the invention, there is attained an adequately rigid wheel disc having a relatively thin wall thickness, in that the crests are offset with respect to the throughs of the undulations by at least the thickness of the wheel disc.

The simple shape of the wheel disc imparts sufficient rigidity thereto so as to avoid the need for employing expensive spring steel. Thus, for example, the wheel disc may be constructed of unalloyed and not heat treated steel, such as, St 50 steel. The wheel disc may also be constructed of pressed or cast light metal. Finally, the wheel disc may also be constituted of plastic material, particularly fiberglass-reinforced polyester.

BRIEF DESCRIPTION OF THE DRAWING

Reference may now be had to the following detailed description of an exemplary embodiment of the invention, taken in conjunction with the accompanying drawing, in which.

DETAILED DESCRIPTION

Figure 1:
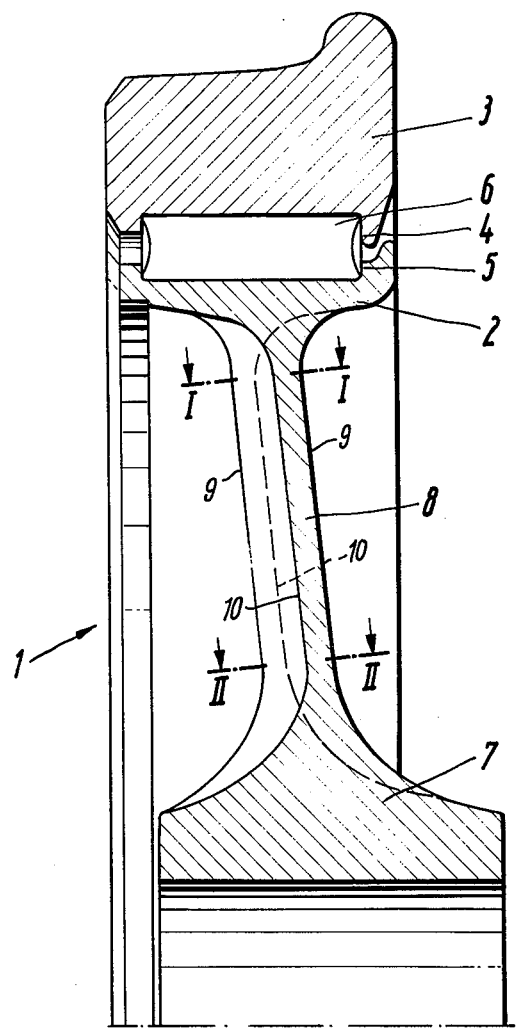
FIG. 1 shows an axial sectional view through one-half of a railway wheel taken along section line 1—1 in FIG. 4.
Figure 4:
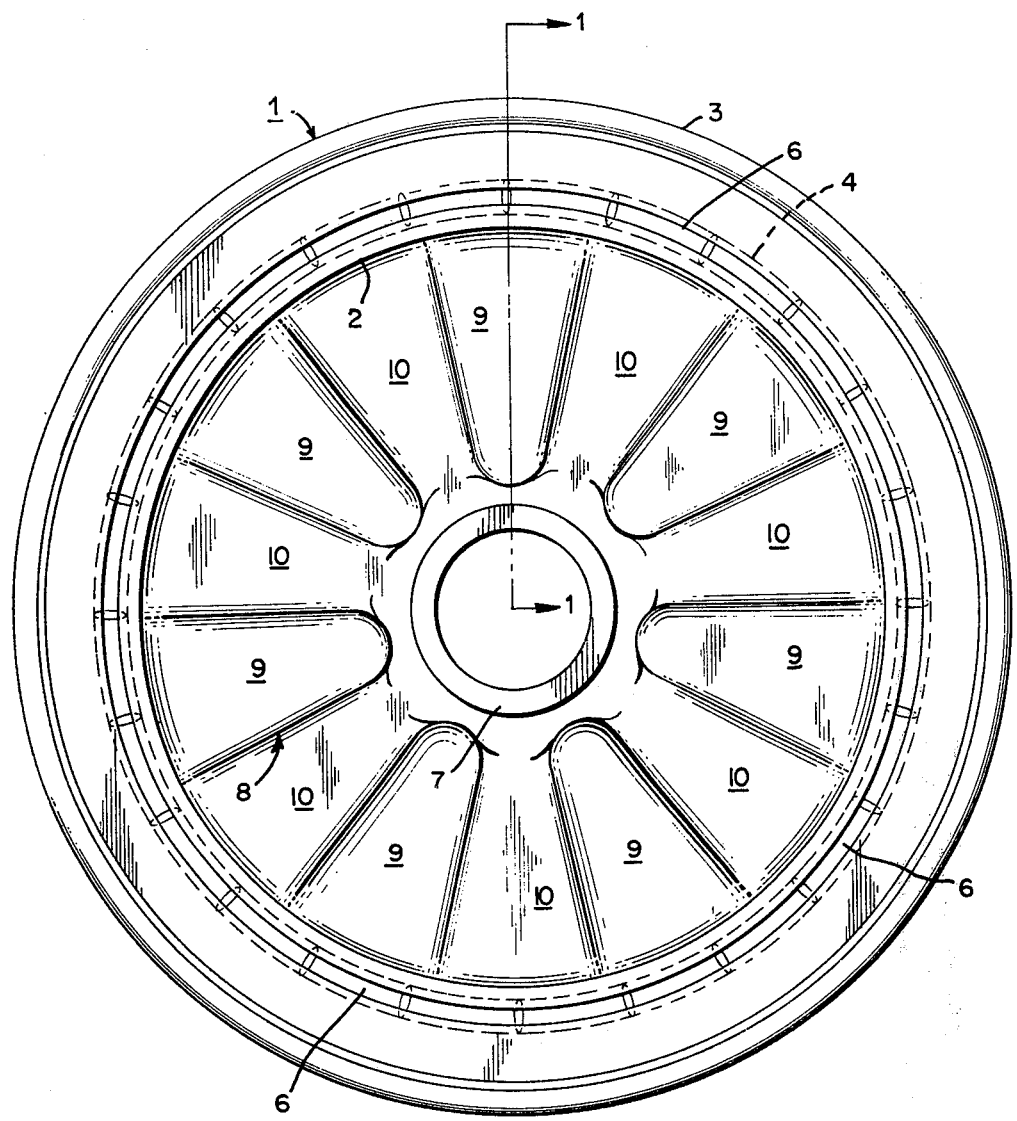
FIG. 4 is a side view of the railway wheel.

Referring now in detail to FIGS. 1 and 4 the drawing, a railway wheel of lightweight construction consists of a wheel disc body 1 having a wheel rim 2, and with a wheel tire 3 pretension-mounted on the wheel rim 2. INtermediate an inner annular groove 4 formed in the wheel tire 3 and an outer annular groove 5 formed in the wheel rim 2, there is positioned a rubber insert having the form of individual pre-stressed rubber blocks 6 supported in interstices. A wheel disc 8 which interconnects the wheel rim 2 with a wheel hub 7, has a flat conical basic configuration and is undulated in the tangential direction thereof. The section illustrated in FIG. 1 extends through the apex of a crest of an undulation. The portion of the undulation behind the crest is indicated in chain-dotted form. In the embodiment of FIG. 1 the crest 9 is offset with respect to its trough 10 by an extent of two or three wheel disc thicknesses.

Figure 2:
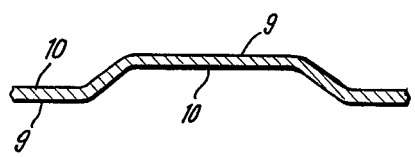
FIG. 2 is a sectional view through the railway wheel in the region of the wheel disc taken along line I—I in FIG. 1.
Figure 3:
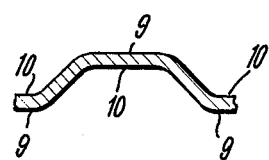
FIG. 3 is a sectional view similar to that of FIG. 2 taken along line II—II in FIG. 1

In FIGS. 2 and 3 of the drawing there are illustrated two mutually radially offset cross-sections of the same undulation. The undulation thereby is trapezoidally shaped, so that the width of the undulation in proximity to the hub is smaller than in the region which is remote from the hub. The radii of curvature of the transitional portions between crest and trough or, respectively, the inclined extending regions, are constant throughout the overall radial length. Similarly constant is the extent of offset of a crest with respect to a trough. These constant dimensions as measured in the radial direction facilitate the utilization of an inexpensive die for the manufacture of the wheel disc.

The inventive railway wheel of lightweight construction can, in comparison with other lightweight constructed railway wheels, be much lighter dimensioned for supporting the same loads. The railway wheel does not require, in addition to the tangentially extending undulations, any auxiliary radially extending undulations. It is adequate that the wheel disc have a slightly conical basic configuration. Furthermore, this conical basic configuration facilitates the use of a simple die for the manufacture of the wheel disc. The connection of the wheel tire with the wheel disc body through the intermediary of a rubber insert also provides for a further important advantage with respect to the lightweight construction, since there may be provided a wheel disc body of aluminum for a wheel tire of steel, without the formation of oxide due to an electrochemical series voltage, as would be the case between a shrink-fitted steel wheel tire and aluminum disc wheel body.

While there has been shown what is considered to be the preferred embodiment of the invention, it will be obvious that modifications may be made which come within the scope of the disclosure of the specification.

What is claimed is:

1. In a railway wheel of lightweight construction including a wheel disc body having a radially outer wheel rim and a radially inner hub; an annular constant radius outer groove being formed in said wheel rim; a wheel tire being mounted on said wheel rim; an annular constant radius inner groove being formed in said wheel tire; annularly spaced prestressed rubber insert means being inserted between said grooves for mounting said wheel tire on the wheel rim of said disc body under a tension force; and said wheel disc body being a wheel disc of an essential flat conical basic configuration being linear in the radial direction thereof and undulated between two parallel planes in the radial direction by radially extending crests and troughs, the improvement comprising: said wheel disc and said hub being of unitary stressed steel construction, the crests of the undulations being displaced relative to the troughs to increase the rigidity of said wheel disc; and said prestressed rubber insert means being a plurality of rectangular rubber block inserts in adjacent spaced relationship to each other.

2. Railway wheel as claimed in claim 1, said undulation having transitional portions between crests and troughs having a constant curvature over their overall radial lengths.

3. Railway wheel as claimed in claim 1, said undulation being essentially trapezoidally shaped.

* * * * *